(12) United States Patent
Pottmeyer et al.

(10) Patent No.: US 8,579,007 B2
(45) Date of Patent: Nov. 12, 2013

(54) REFLECTIVE HUNTING BLIND

(75) Inventors: Kevin L. Pottmeyer, Belpre, OH (US); Chester W. Burdette, Marietta, OH (US)

(73) Assignee: GhostBlind Industries, Inc., Marietta, OH (US)

( * ) Notice: Subject to any disclaimer, the term of this patent is extended or adjusted under 35 U.S.C. 154(b) by 65 days.

(21) Appl. No.: 12/615,669

(22) Filed: Nov. 10, 2009

(65) Prior Publication Data

US 2010/0116442 A1    May 13, 2010

Related U.S. Application Data

(60) Provisional application No. 61/114,089, filed on Nov. 13, 2008, provisional application No. 61/224,105, filed on Jul. 9, 2009.

(51) Int. Cl.
| | | |
|---|---|---|
| *E06B 3/48* | (2006.01) | |
| *E06B 9/00* | (2006.01) | |
| *A47G 5/00* | (2006.01) | |

(52) U.S. Cl.
USPC ......... 160/229.1; 160/352; 160/135; 160/351

(58) Field of Classification Search
USPC .............. 160/135, 229.1, 351, 352, 230, 232; 135/901; 89/36.06, 36.05, 36.07, 89/36.09, 926, 927, 929
See application file for complete search history.

(56) References Cited

U.S. PATENT DOCUMENTS

| | | | |
|---|---|---|---|
| 1,649,996 A * | 11/1927 | Toth ................................... 2/2.5 |
| 2,109,831 A * | 3/1938 | Szalkay ....................... 109/49.5 |
| 2,316,055 A * | 4/1943 | Davey .......................... 89/36.05 |
| 2,827,729 A * | 3/1958 | Hoene .................................. 43/1 |
| 3,125,155 A * | 3/1964 | Frommelt et al. ............. 160/230 |
| 3,933,164 A * | 1/1976 | Ness et al. ....................... 135/95 |
| 3,936,969 A * | 2/1976 | Richard .............................. 43/1 |
| 4,506,467 A * | 3/1985 | Strung ................................ 43/1 |
| 5,142,833 A | 9/1992 | Svehaug |
| 5,293,807 A * | 3/1994 | Hajdu .......................... 89/36.07 |
| 5,373,863 A * | 12/1994 | Prizio ............................. 135/97 |
| 5,570,735 A * | 11/1996 | Chu ......................... 160/370.23 |
| 5,592,960 A | 1/1997 | Williams |
| 6,202,666 B1 | 3/2001 | Rehbein |
| 6,408,865 B1 * | 6/2002 | Bliss .............................. 135/118 |
| 6,595,101 B2 * | 7/2003 | Baker .......................... 89/36.05 |
| 6,691,601 B2 * | 2/2004 | Cohen et al. ................. 89/36.05 |
| 6,886,446 B1 * | 5/2005 | Baker .......................... 89/36.05 |
| 6,941,961 B1 * | 9/2005 | Eastman, II .................. 135/121 |
| 6,942,065 B1 | 9/2005 | Price |

(Continued)

*Primary Examiner* — Blair M Johnson
*Assistant Examiner* — Jaime F Cardenas-Garcia
(74) *Attorney, Agent, or Firm* — Jason H. Foster; Kremblas & Foster

(57) ABSTRACT

An improved hunting blind having a mirrored outwardly facing surface and a camouflaged inwardly facing surface. The blind includes four panels that are hingedly connected together with invisible hinges for allowing the blind to be foldably compacted in the manner of an accordion for conveniently storing and transporting the blind. The top edge of the blind is formed with an irregular, zig-zag shaped contour for allowing the blind to blend in with a natural surrounding environment. When the blind is expanded and erected for use, the mirrored front surface of the blind is tilted forward. A game animal looking onto the front of the blind from a distance therefore sees only a reflection of the terrain surrounding the blind, thereby making the blind substantially indiscernible from the surrounding terrain and effectively obscuring a hunter positioned behind the blind.

16 Claims, 11 Drawing Sheets

(56) References Cited

U.S. PATENT DOCUMENTS

| | | | | |
|---|---|---|---|---|
| D519,280 S * | 4/2006 | Kellogg et al. | | D3/305 |
| 7,216,644 B2 * | 5/2007 | Haugen | | 124/86 |
| D557,867 S * | 12/2007 | Northrop | | D30/161 |
| 7,424,844 B2 * | 9/2008 | Carter | | 89/36.07 |
| 7,520,206 B2 * | 4/2009 | Baker | | 89/36.06 |
| 7,770,573 B2 * | 8/2010 | Haugen | | 124/86 |
| 7,980,166 B1 * | 7/2011 | Fuqua et al. | | 89/36.07 |
| D642,699 S * | 8/2011 | Hunter et al. | | D25/7 |
| D642,700 S * | 8/2011 | Hunter et al. | | D25/7 |
| 2005/0155259 A1 * | 7/2005 | Virvo | | 40/124.09 |
| 2005/0217472 A1 * | 10/2005 | Baker | | 89/36.06 |
| 2007/0006909 A1 | 1/2007 | Lewis | | |
| 2007/0149051 A1 | 6/2007 | Prock | | |
| 2007/0251561 A1 * | 11/2007 | Lee | | 135/114 |
| 2008/0083443 A1 | 4/2008 | Eastman, II | | |
| 2008/0144203 A1 | 6/2008 | Williams | | |

* cited by examiner

REFLECTIVE HUNTING BLIND

(e) BACKGROUND OF THE INVENTION

1. Field of the Invention

This invention relates generally to the field of hunting camouflage, and more particularly to a highly portable, reflective hunting blind for substantially obscuring a hunter when observing and firing upon prey.

2. Description of the Related Art

Traditionally, hunters and other outdoorsmen, such as photographers and birdwatchers, have used concealment methods to hide themselves from wildlife. Customary methods include some type of structure that removes the hunter from an animal's line of sight, such as tree stands, or "blinds", which are structures used to hide the person from catching the animal's attention. Such blinds include fabric ground blinds, box blinds, elevated box blinds or natural blinds, which are made of natural materials. Each of these methods has advantages and disadvantages that are known in the art.

A hunter using one or more of these concealment methods may get "busted", which is a term used to describe when the animal becomes aware of the hunter due to a failure of the concealment method or other reason, such as when a hunter makes a mistake in use of the concealment method. For example, the wind may shift allowing the animal to detect the hunter's scent, or the hunter may make a noise.

Disadvantages of traditional hunting blinds, such as tree stands, include that they are heavy, cumbersome and difficult to carry into and out of the woods. Additionally, such stands can be noisy and time-consuming to set up and remove, which can scare away game. Tree stands require the availability of a tree of a size within a specific range, and such a tree may not be found in the desired hunting location.

Due to the nature of how tree stands are used, such stands have the potential to be very dangerous. Death and disability can result from a fall from a tree stand, or if the hunter falls while installing or getting into such a stand. A hunter must be physically fit to carry a tree stand or blind into the woods and install it. A hunter who has poor health can suffer a heart attack or stroke due to the extreme physical demands placed on him by installation of a tree stand.

Even if the stand works well, hunters who use tree stands find it difficult to move to another location quickly if they get "busted" or if they simply want to hunt in different areas. Still further, tree stands allow for very little concealment of the hunter, which means that a hunter is exposed to view by animals, and cannot move around for comfort or even to use game calls. Also important is that hunters in tree stands are not well protected from wind, which can be substantial 8 to 15 feet above the ground. It is impractical to use a portable heater in the small space provided by a tree stand.

Fabric ground blinds eliminate some disadvantages of the tree stand, but have other disadvantages. For example, most fabric ground blinds cannot be set up quickly. Instead, they must be "brushed in" with branches and leaves to conceal their shape in order to be effective. Additionally, they must be left in an area for a period of time so wildlife can become accustomed to their unnatural shape. These limits affect their use on public lands due to regulations prohibiting cutting brush and limitations on leaving a blind in place for an extended period of time. Some fabric ground blinds also have viewing and firing restrictions that prevent use around their entire perimeter.

Elevated box blinds are not easily transported due to their weight, and are expensive when compared to other types of blinds and tree stands. Such blinds must similarly be left in an area for an extended period of time to allow wildlife to adapt to their shape and/or structure. Such blinds are not practically re-located, nor can they be set up and used quickly. Thus, they are not practical for public land use.

Natural blinds are time-consuming to build, because the hunter must use brush, logs, leaves and other natural elements. They are not portable due to their construction. Hunters are exposed to wind in such blinds, and they are not practical for public lands.

Therefore, the need exists for a hunting blind that overcomes many of the disadvantages of the existing concealment methods and apparatuses.

(f) BRIEF SUMMARY OF THE INVENTION

The present invention is a hunting blind that includes many of the advantages of the prior art concealment methods without most of the disadvantages. Many factors have been taken into consideration when designing the mirrored hunting blind including portability, rapid setup and hunting, virtual invisibility, comfort and safety.

The hunting blind comprises a plurality of substantially planar panels foldably connected to one another in a side-by-side relationship. Each panel has a camouflaged inwardly-facing surface and a reflective outwardly-facing surface. An irregularly contoured top edge allows a hunter to observe and fire upon prey from behind the hunting blind while remaining substantially obscured by the hunting blind.

In a preferred embodiment, the hunting blind has panels formed of two base sheets of rigid, lightweight material. Preferably, each base sheet has a first major surface and an opposing second major surface. The first major surfaces of the base sheets are mounted together in a flatly abutting relationship. The second major surface of one of the base sheets is covered with a reflective material and the second major surface of the other base sheet is covered with a camouflage material. These materials are preferably arranged in a sandwiching relationship.

With the hunting blind, setup is very quick by unfolding the panels relative to one another. Once the blind is set up, the user can hunt or otherwise view the outdoors. The blind can be moved and set up very quickly due to the manner in which the panels fold and unfold relative to one another. Because of the reflective surfaces, the surrounding terrain is reflected back toward the approaching animals, thereby making the blind and anything behind it virtually invisible.

Hunters seated or standing behind the blind do so on the ground or a chair, which increases comfort. There is no need to assemble the blind, such as with a tree stand or other conventional blind, nor are there unsafe steps that need to be taken in order to use the blind. The blind is lightweight and easy to carry, and preferably has loops that can be used to tie it down with string and tent stakes, if needed. Other loops are used to attach shoulder straps that can be used to carry the blind in the manner of a backpack.

The blind has reflective panels at the proper angle to reflect the immediately surrounding environment to approaching game. Observation holes are preferably formed in each reflective panel to make viewing wildlife in close proximity easy while keeping the hunter hidden. The blind is designed without undesired angles or corners, and without any unnatural horizontal or vertical lines.

The blind also blocks wind, thereby reducing discomfort to hunters. Furthermore, hunters can use a portable heater behind the blind to increase comfort. The blind is designed to conceal about a 160 degree area that is preferably about 48 inches high in front of the hunter. Additional reflective panels can be added for additional concealment.

The blind's panels also muffle or redirect noise somewhat, because the sides of the panels facing the hunter are preferably covered with soft, water-repellant, camouflage fabric. The sounds made from game calling can be deflected by the mirrored hunting blind, thereby making it difficult for wildlife to detect from where the calling sounds originated, thereby keeping the hunter from being "busted".

An irregular shape of the top edge of the panels blends in with the environment, because there are essentially no straight, horizontal lines in nature. Such an irregular shape allows for viewing of game while disguising the outline (silhouette) of the hunter's head and shoulders. The blind's shape also allows hunters to shoot any weapon without rising up above the blind. Furthermore, the open design of the blind allows shooting without problems with vertical recoil of a rifle or shotgun.

The hunter has both hands free to handle the weapon, which enables them to hunt while carrying gear to their hunting location. Invisible hinges on the blind are concealed within each panel and allow for the full reflection of the surrounding environment on the front of each of the reflective panels. This simultaneously allows for the full camouflage effect on the back side of each panel.

A hunter can easily transport the hunting blind in the trunk of a small car. The lightweight, compact design allows hunters to carry the mirrored hunting blind with the included shoulder strap in and out of the woods with very little effort. The lightweight design and shoulder strap allow a hunter to easily carry other hunting equipment desired, such as a rifle, bow, folding chair, etc. The hunting blind includes hardware to attach such equipment if desired.

The mirrored hunting blind is a superior blind when compared to other conventional blinds. While each type of blind has advantages and disadvantages, the hunting blind of the present invention has most of the advantages while eliminating practically all of the disadvantages associated with prior art blinds.

(g) BRIEF DESCRIPTION OF THE SEVERAL VIEWS OF THE DRAWINGS

Figure 1:
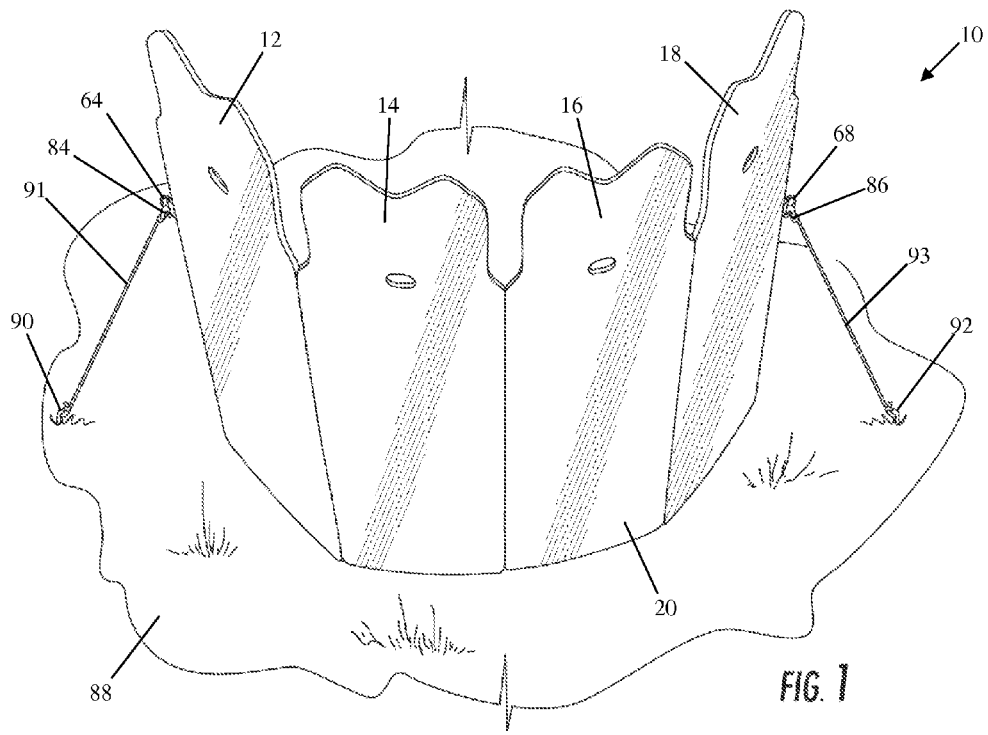
FIG. 1 is a front perspective view illustrating the preferred embodiment of the present invention expended and erected for use.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or terms similar thereto are often used. They are not limited to direct connection, but include connection through other elements where such connection is recognized as being equivalent by those skilled in the art.

(h) DETAILED DESCRIPTION OF THE INVENTION

Figure 2:
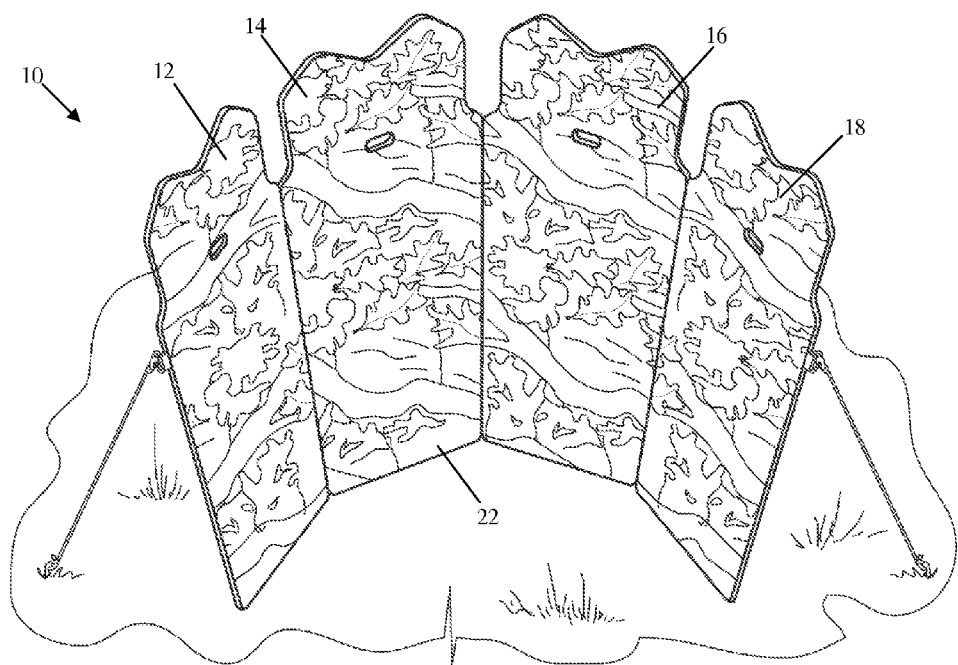
FIG. 2 is a rear perspective view illustrating the preferred embodiment of the present invention shown in FIG. 1.

Referring to FIGS. 1 and 2, a portable, reflective hunting blind for obscuring a hunter while he or she observes and fires upon game is indicated generally at 10. While the terms "hunter" and "hunting" are used throughout this description, it should be noted that the blind described herein can be used for any situation in which a person or object is desirably concealed from another person, animal or object. This includes, but is not limited to, hunting prey using firearms and primitive weapons, photographing wildlife, watching wildlife, such as birds, and military uses, such as reconnaissance and snipers. Thus, the terms "hunter", "hunting" and its derivatives are used herein for all such equivalent situations.

Figure 3:
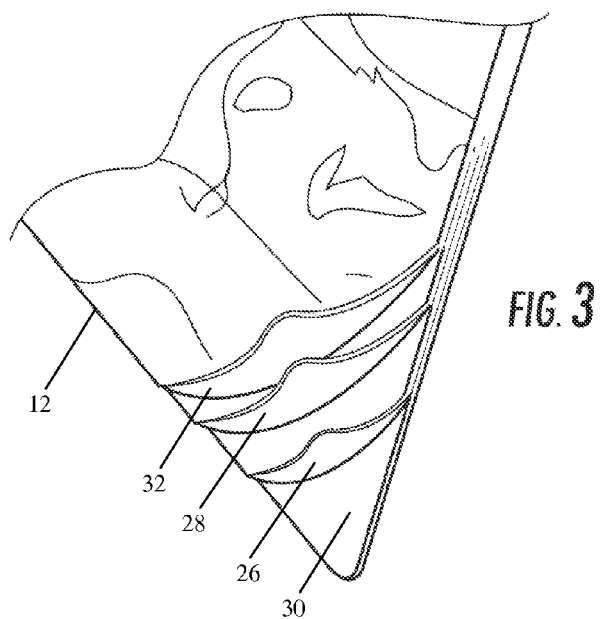
FIG. 3 is a detail view illustrating the various layers of a panel of the present invention shown in FIG. 1. Although the FIG. 3 embodiment is shown with layers peeled back, this is not intended to require such layers to be relatively flexible to enable such a configuration to be prepared by hand.

The blind 10 is made of rigid, lightweight panels 12, 14, 16 and 18 that are hingedly connected at common edges for allowing the blind 10 to be foldably collapsed for transport and expanded for use. Each of the panels 12-18 has a mirrored front surface 20 and preferably a camouflaged rear surface 22. The panels 12-18 fold relative to one another in the manner of an accordion, thereby allowing the mirrored front surfaces 20 of the panels 12-18 to flatly seat against one another in a compact, parallel configuration and to open to face away from a hunter in the expanded configuration as will be described in greater detail below. Referring to FIGS. 2 and 3, the expanded blind 10 preferably extends approximately 160 degrees around a hunter 24 (FIG. 4) so that game animals looking onto the mirrored front surface 20 of the blind 10 see only a reflection of the terrain surrounding the blind 10, rather than the hunter positioned behind the blind 10.

Figure 6:
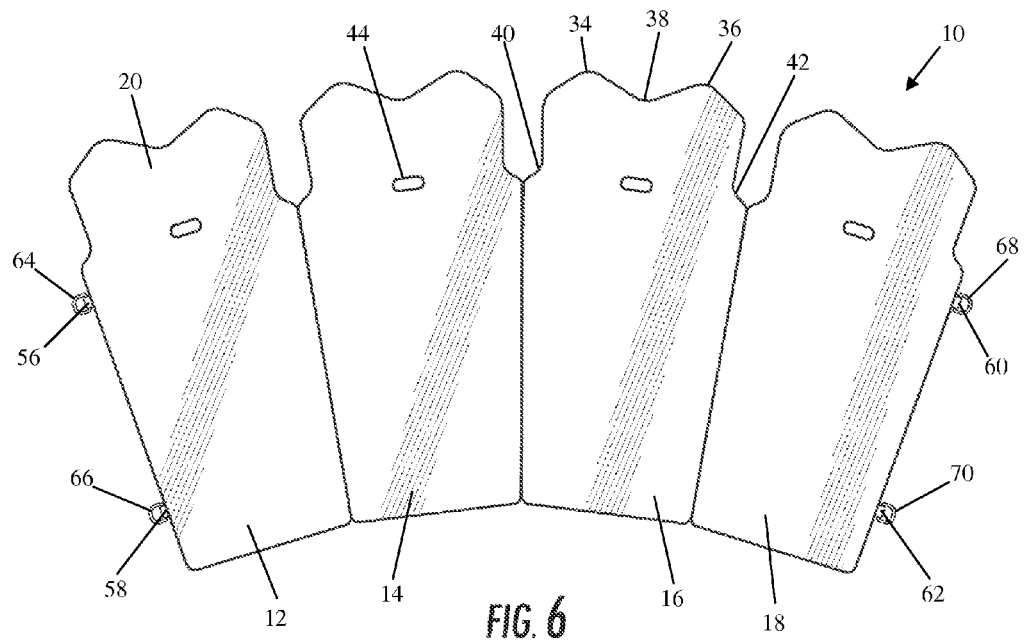
FIG. 6 is a front view illustrating the preferred embodiment of the present invention shown in FIG. 1.
Figure 7:
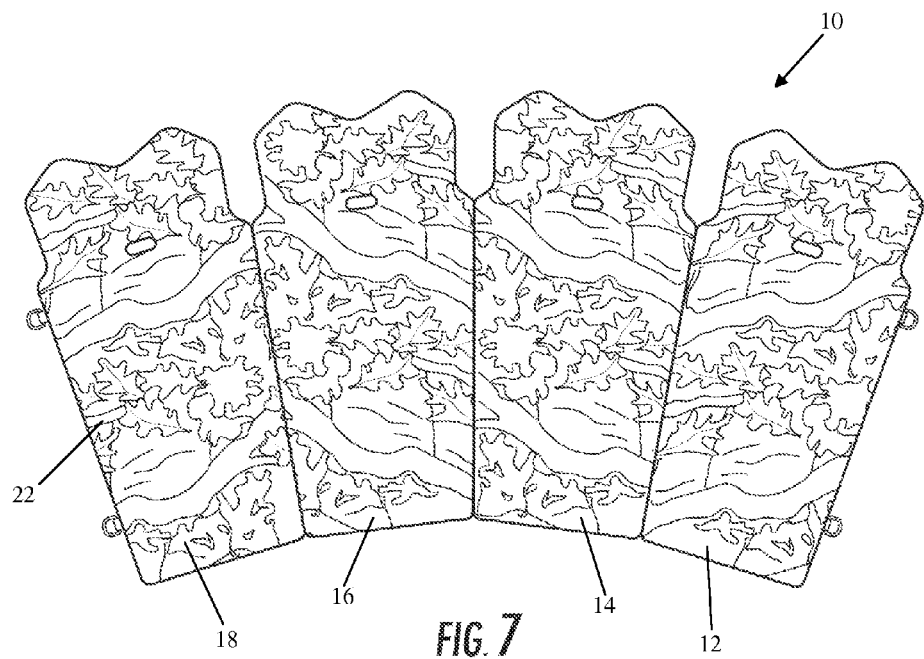
FIG. 7 is a rear view illustrating the preferred embodiment of the present invention shown in FIG. 1.

Referring now to FIGS. 3, 6 and 7, each panel of the blind 10 is fabricated from a front base sheet 26, a rear base sheet 28, a reflective material layer 30 and a camouflage material layer 32 (panels 14-18 are not shown in FIG. 3 but are substantially identical to panel 12 in construction). The front and rear base sheets 26 and 28 are formed of waterproof, fluted, 4 mm corrugated plastic, although it is contemplated that the panels 12-18 can alternatively or additionally be formed of any other suitably lightweight, rigid, and preferably waterproof material, including, but not limited to, expanded, closed-cell PVC board, extruded polystyrene foam board, aluminum covered polyethylene core sheets, fluted polypropylene, polycarbonate sheets or any combination thereof. The rear surface of the front base sheet 26 and front surface of the rear base sheet 28 are rigidly mounted together in a flatly abutting relationship, such as with conventional adhesive or double-sided tape. The height and width of the rear base sheet 28 are preferably slightly smaller than the height and the width of the front base sheet 26 so that the rear base sheet 28 cannot be seen when viewing the panel 12 from the front, but this is not critical.

The reflective material layer 30 is formed of a sheet of minor film that is affixed to the front surface of the front base sheet 26 with adhesive. The mirror film is preferably a metalized nylon or polyester film, such as is sold under the brand names MYLAR or DURALAR. The film is preferably 5 millimeters thick, although it is contemplated that other thicknesses and other materials can additionally or alternatively be used for this invention, as will be understood from this description by the person having ordinary skill in the technology. For example, some aluminum foils are acceptable substitutes. It is contemplated, to aid in manufacture of the panels 12-18, that an adhesive mounting film can be applied to the rear of the mirror film to provide adhesion to the rigid front base sheet 26. Still further, a transparent overlaminate film can be applied to the front surface of the minor film to protect the mirror film.

Importantly, the reflective material layer 30 is flatly and evenly installed and trimmed on the panel 12 to eliminate any rolled edges or uneven surfaces that might create any unwanted and unnatural sun reflections or lines that may spook wildlife looking onto the front of the blind 10. The reflective material layer 30 is cut precisely on the perimeter edge of the front base sheet 30 so that none of the non-reflective edges of the front base sheet 30 are visible from the front view of the panel 12. Only the reflective material layer 30, which reflects, can be seen from the front view of the panel 12, making it nearly impossible for wildlife to distinguish the panel 12 from surrounding terrain, as will be discussed in greater detail below.

Still referring to FIGS. 3, 6 and 7, the camouflage material layer 32 is formed of water-repellant camouflage fabric that is secured to the rear face of the rear base sheet 28 with conventional adhesive or double-sided tape. It is contemplated that vinyl, laminate, or any other suitably durable and water-resistant material can additionally or alternatively be used to form the camouflage material layer 32. It is further contemplated that camouflage materials featuring any of a variety of conventional camouflage designs or colors, including, but not limited to forest designs, jungle designs, desert designs, winter designs, drab colors and earth tones can be used to form the camouflage material layer 32 for optimizing the blind's ability to blend in when the blind 10 is used in a variety of different terrains. Thus, the term "camouflage" and its derivatives is used broadly herein to include any surface purposely colored, textured or both for the purpose of obscuring its visibility in its environment.

The camouflage material layer 32 preferably extends over the edges of the rear base sheet 28 and is affixed to the front face of the rear base sheet 28 to provide the edges of the rear base sheet 28 with a finished, camouflaged appearance. As with the reflective material layer 30, it is contemplated that an adhesive mounting film can be applied to the rear of the camouflage material layer 32 to provide convenient adhesion to the rear base sheet 28 during manufacture. Still further, a transparent overlaminate film can be applied to the camouflage material layer 32 for additional protection.

Referring to FIGS. 6 and 7, each panel 12-18 of the blind 10 has a greatest height of about 48" and a greatest width of about 26", although it is contemplated that the size of the panels 12-18 can be varied as may be necessary to suit a particular application. Importantly, the vertical edges of each panel 12-18 are angled laterally outwardly from the bottom edge of the panel to the top of the panel. Therefore, when the blind 10 is expanded and erected in a nearly semi-circular configuration around a hunter, the blind 10 automatically tilts forward, away from the hunter. With the blind 10 erected and tilted accordingly, an observer (e.g., a game animal) looking onto the reflective front surface of the blind 10 from a distance will only see a reflection on the layer 30 of the terrain immediately adjacent the blind 10, thereby making the blind 10 substantially indiscernible from the surrounding terrain.

Another important feature of the blind 10 is the shape of its perimeter (i.e., the perimeter of the blind 10 when viewed from the front or the rear, as in FIGS. 6 and 7). Specifically, the perimeter of the blind 10 has no corners, which helps to minimize the blind's visibility in natural environments in which angular corners are not commonly found. Moreover, the top edge of each panel 12-18 of the blind 10 features a rounded contour that simulates a wave, of regular or irregular shape, having a neutral axis that is the average height of the panel 12-18. The contour of the top edge can vary from the neutral axis by distances of ¼ inches, ½ inch, 1 inch, 1.5 inches, 2.5 inches, 3 inches, 3.5 inches, 4 inches, 4.5 inches, 5 inches or more than 5 inches to create an irregular shape with several peaks and valleys of varying heights.

Preferably, the contour of the top edge of each panel 12-18 has two upwardly-extending peaks 34 and 36 with a shallow valley 38 therebetween and deep vertical recesses 40 and 42 on the laterally-outermost sides of the peaks 34 and 36. This contour emulates and/or blends well with the natural, irregular elements found in most hunting environments by omitting any substantial horizontal lines that may indicate an unnatural structure to wildlife. An alternative embodiment of the blind 10 is contemplated wherein the vertical recesses 40 and 42 are relatively shallow and wherein the valley 38 is relatively deep (i.e., the reverse of the valley/recess configuration shown in FIGS. 6 and 7). It is also contemplated that each panel can have one peak or more than two peaks, such as three or four or more peaks.

It is contemplated that the contour of the top edges of the panels 12-18, as well as the contour of the rest of the perimeter of the blind 10, can be varied depending on where the mirrored hunting blind 10 is used. For example, the contour could include angled cuts to emulate branches extending from a tree trunk, or curved rolling edges if the blind 10 is used in an open field or grassy area. Generally, it is desirable to avoid any horizontal lines and angular corners in the design of such alternatives.

Figure 4:
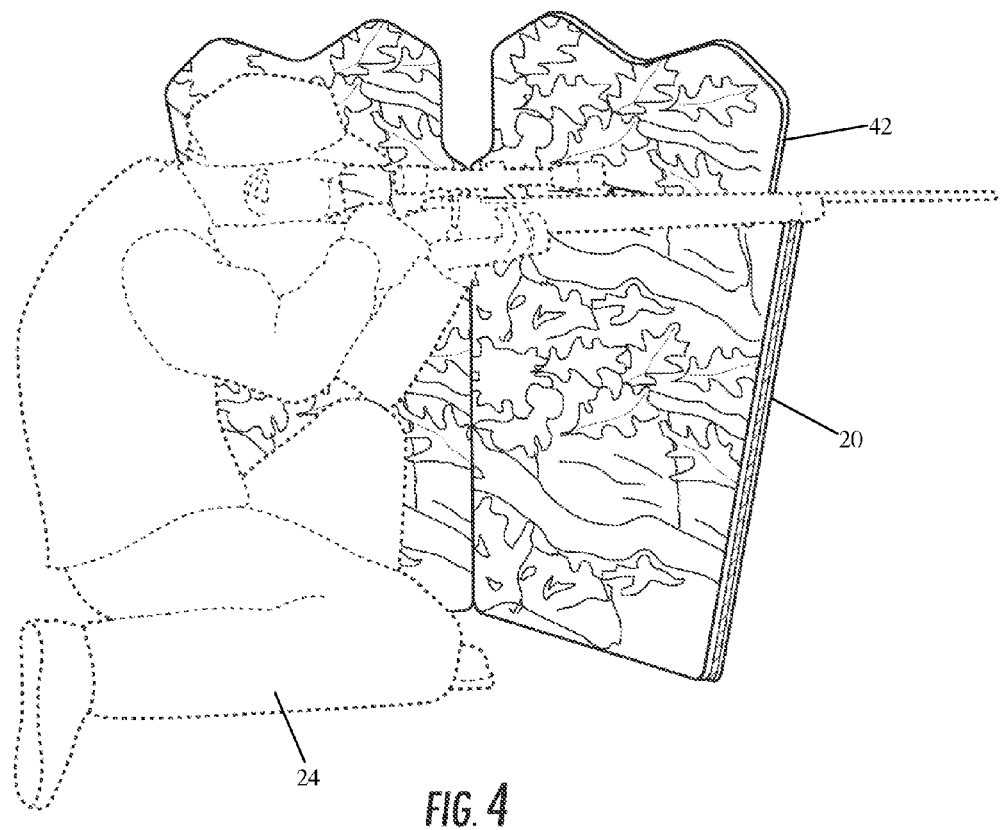
FIG. 4 is a partial side view illustrating the preferred embodiment of the present invention shown in FIG. 1 with a hunter in position behind the blind.

In addition to helping the blind 10 blend in with natural surroundings, the irregularly-shaped contour of the panels 12-18 allow a hunter to peer over the valley regions 38 of the contours or through the deep vertical recesses 40 and 42 while remaining substantially obscured by the peak regions 34 and 36 of the contours. Furthermore, a hunter 24 can use the valley regions 38 and the deep vertical recesses 40 and 42 of the top edge of the blind 10 as a gun rest for stabilizing the barrel of his or her firearm when preparing to fire upon game, as shown in FIG. 4. When the blind 10 is erected for use, the vertically-extending edges of the adjacent vertical recesses 40 and 42 of each pair of hingedly connected panels 12-18 are preferably separated by a distance of about 4 inches for allowing a hunter to comfortably position and fire his or her weapon within the recesses 40 and 42 as shown in FIG. 4.

Still referring to FIGS. 6 and 7, each panel 12-18 of the blind 10 has an observation port 44 formed in it that extends through each of the panel's layers (i.e., the reflective material layer 30, the front and rear base sheets 26 and 28, and the camouflage material layer 32). Each observation port is preferably located about 10 inches from the top edge of the panel 10 and intermediate the lateral edges of the panel 10. The observation port 44 can be formed by cutting an aperture into each of a panel's layers prior to the panel's assembly and subsequently aligning the apertures with each other when the layers are mounted together, or by cutting an aperture through a panel after it has already been assembled. The ports 44 also serve as openings through which a hand can be inserted for lifting the blind 10.

When the hunting blind 10 is in use, the observation port 44 allows a hunter to view the area on the opposite side of the blind 10 while the hunter remains substantially concealed behind the blind 10, thereby mitigating the risk of spooking wildlife. The observation port preferably measures about 5 inches wide and 2 inches tall and has rounded corners, although it is contemplated that the observation port 44 can have virtually any shape and size as long as a hunter positioned behind the blind 10 is substantially obscured. For example, it is contemplated that the observation port 44 can be square, triangular, diamond-shaped, or can be an elongated slit.

Figure 5A:
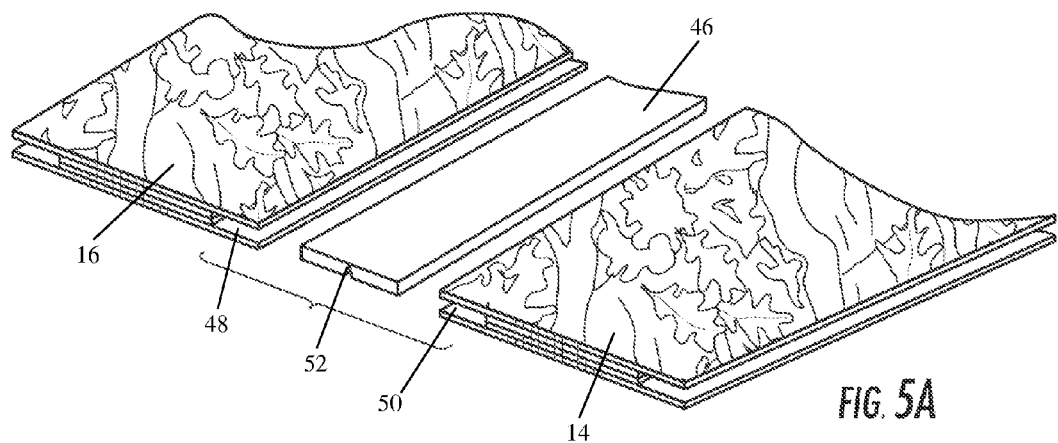
FIG. 5a is a detail, exploded view illustrating a hinge of the preferred embodiment of the present invention shown in FIG. 1.
Figure 5B:
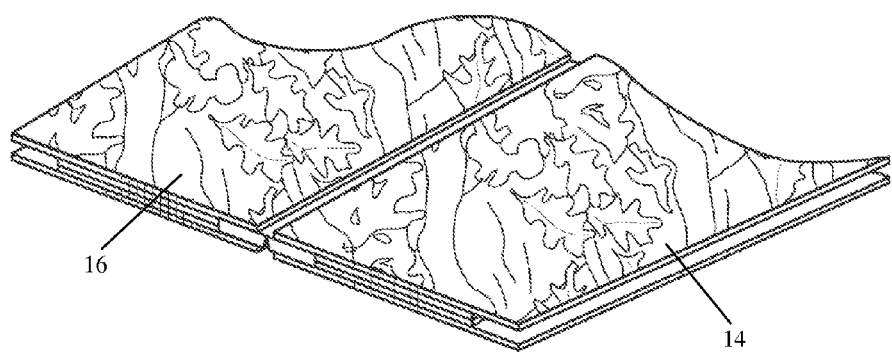
FIG. 5b is a detail view illustrating a hinge of the preferred embodiment of the present invention shown in FIG. 1 in an expanded configuration.
Figure 5C:
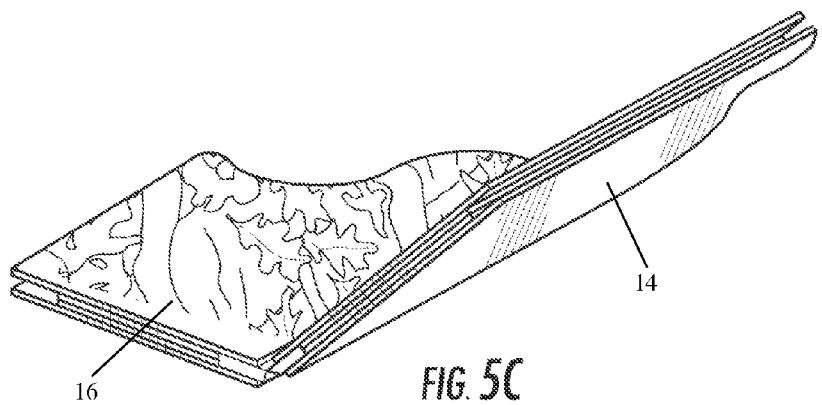
FIG. 5c is a detail view illustrating a hinge of the preferred embodiment of the present invention shown in FIG. 1 in a partially folded configuration.

Referring to FIGS. 5*a*-5*c*, each pair of adjacent panels 12-18 is hingedly connected together by an "invisible" hinge 46 (only the hinge 46 that connects panels 14 and 16 is shown, but the hinges connecting panels 12 and 14 and panels 16 and 18 are substantially identical). The term "invisible," as used herein with regard to the hinge 46, means that the majority of the hinge 46 is substantially hidden from view when the blind 10 is expanded and erected for use. The hinge 46 is formed of an elongated, planar segment of flexible material that fits snugly into the elongated slots 48 and 50 formed in the vertical edges of the hinge's adjacent panels 14 and 16. The hinge 46 is securely mounted within the slots 48 and 50 with conventional adhesive or fasteners. A narrow segment of the hinge 46 is exposed intermediate the panels 14 and 16 for allowing the hinge 46 to be folded approximately 180 degrees without interference from the edges of the adjacent panels 14 and 16.

An elongated, V-shaped groove 52 is preferably cut into the exposed portion of the hinge 46 to allow the hinge 46 to fold more easily in an intended direction. The hinge 46 mounted in the center of the blind 10 between panels 14 and 16 is grooved on its front surface and the laterally outermost hinges (not pictured) intermediate panels 12 and 14 and panels 16 and 18 are grooved on their rear surfaces, thereby allowing the blind 10 to be folded in the manner of an accordion, with the mirrored front surfaces of the panels 12-18 folding flatly against one another and the camouflage surfaces being out. The relatively delicate reflective surfaces of the blind 10 are thereby protected from being scratched or damaged during storage and transportation, and this prevents the reflective surfaces from reflecting during transport through the woods or fields, thereby "spooking" animals.

Although invisible hinges such as the hinge 46 described above are preferred for foldably connecting the panels 12-18 of the blind 10 together, it is contemplated that any other type of hinge structure can additionally or alternatively be used, including, but not limited to conventional plastic or metal hinges, piano hinges, heavy duty canvas, heavy duty reinforced tape or any other flexible material suitable for live hinges. It is further contemplated that the hinges can alternatively be taped, riveted or glued to the front or rear surfaces of the panels 12-18.

Figure 16:
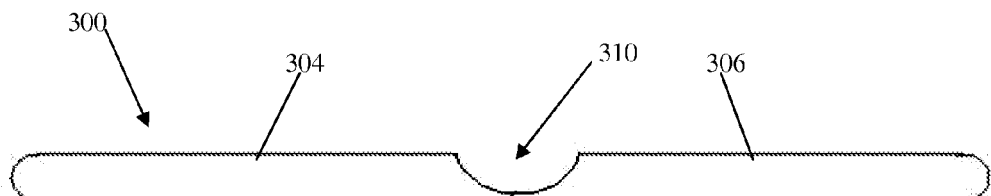
FIG. 16 is a schematic top view illustrating a hinge groove on the present invention.
Figure 17:
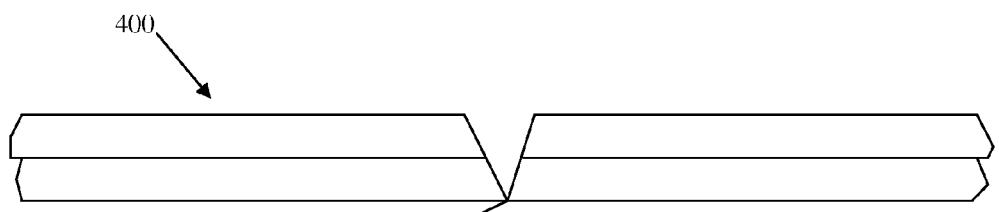
FIG. 17 is a schematic top view illustrating an alternative hinge groove on the present invention.
Figure 18:
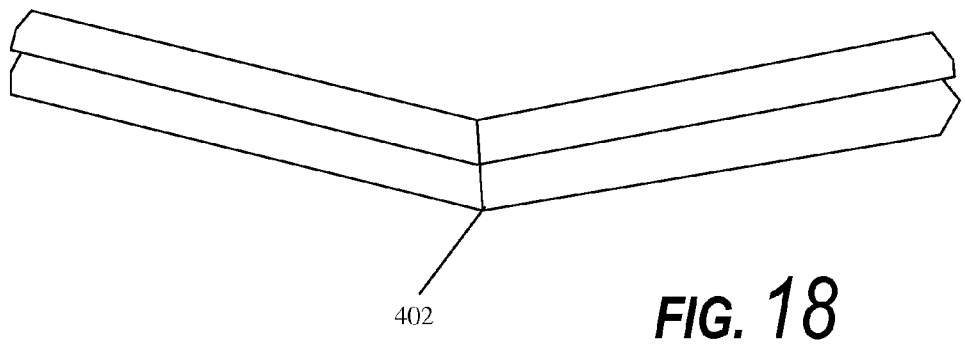
FIG. 18 is a schematic top view illustrating the embodiment of FIG. 17 with the panels adjacent the hinge groove bent relative to one another.
Figure 19:
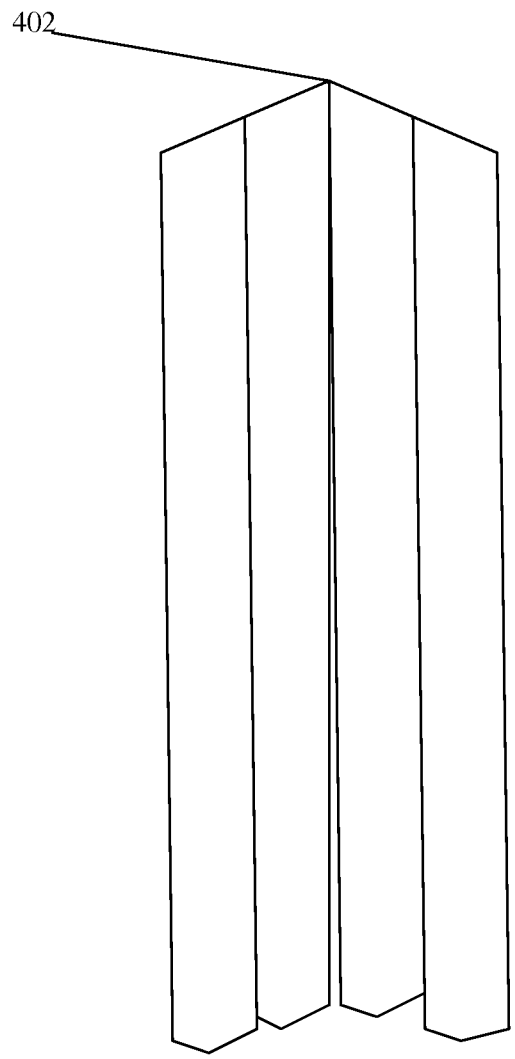
FIG. 19 is a schematic top view illustrating the embodiment of FIG. 17 with the panels adjacent the hinge groove bent relative to one another in the opposite direction from that shown in FIG. 18.

The front panels, i.e., the panels at the center of the blind, can be hinged together with polymer hinges that are glued or fastened to the panels with heavy duty, double-faced tape. An alternative to such structures includes live hinges, which can be formed by cutting a V-shaped groove out of the back of a large sheet 300 as shown in FIG. 16, thereby leaving a thin "bridge" 302 at the front surface between the two panels 304 and 306 on either side of the groove 310. The thin "bridge" flexes when the panels are hinged relative to one another, as shown in FIGS. 18 and 19. By cutting through one side of the sheet to form the groove, the plastic sheet 400 (see FIGS. 17, 18 and 19) that remains acts as a hinge along the groove where the "bridge" 402 is formed. In this way one forms a locally thinner region at the deepest part of the groove. For the hinge at the center of the blind, the groove is cut in the back of the panel and the mirrored, front-facing surface forms the hinge that is bent. For hinges at the sides of the blind, the groove is cut in the front of the panel and the camouflaged, back-facing surface forms the hinge that is bent.

Referring again to FIGS. 6 and 7, four mounting straps 56, 58, 60 and 62 extend laterally-outwardly from the vertical edges of the blind 10 adjacent the top and bottom edges of the outermost panels 12 and 18. The mounting straps 56-62 are preferably formed of segments of heavy-duty canvas strap or similar flexible, lightweight material that are sandwiched between the front and rear base sheets 26 and 28 of the outermost panels 12 and 18 and are rigidly mounted thereto with adhesive and/or fasteners, such as rivets. Each mounting strap 56-62 preferably loops through a conventional D-ring 64, 66, 68 and 70 or similar connective structure, such as various conventional clips, fasteners, loops or hooks.

Figure 8:
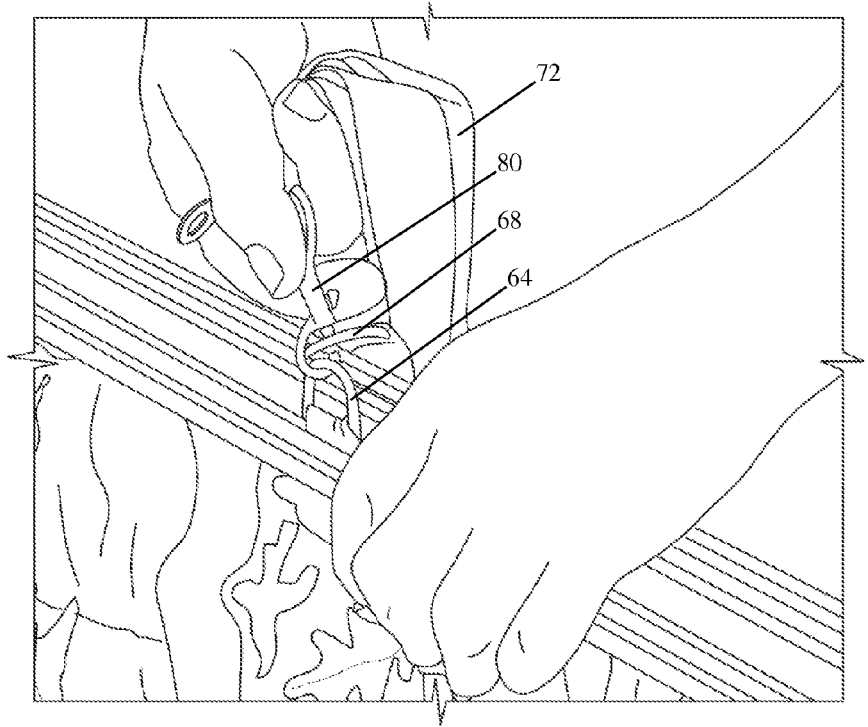
FIG. 8 is a detail view illustrating the attachment of a shoulder strap to the preferred embodiment of the present invention shown in FIG. 1.
Figure 9:
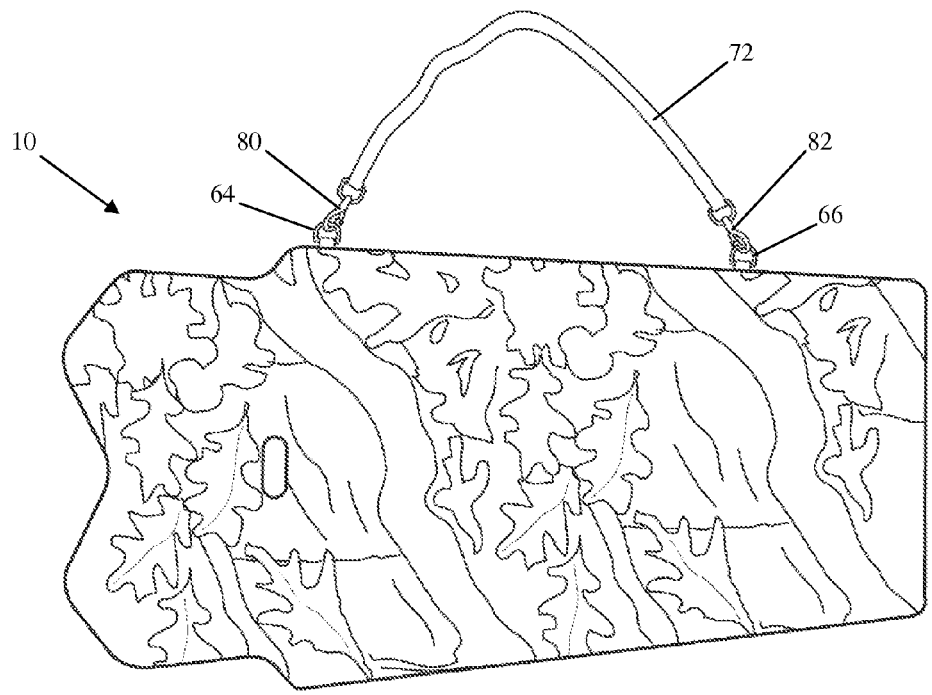
FIG. 9 is a side view illustrating the embodiment of the present invention shown in FIG. 1 in a compacted configuration with a shoulder strap attached thereto.
Figure 10:
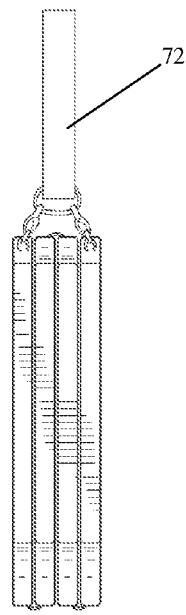
FIG. 10 is an end-on view illustrating the embodiment of the present invention shown in FIG. 1 in a compacted configuration with a shoulder strap attached thereto.

Referring to FIGS. 8-10, when the blind 10 is folded for transportation a conventional shoulder strap 72 can be attached to each pair of adjacent D-rings 64-70 (i.e., one pair of adjacent D-rings 64 and 68 near the top of the blind 10 and one pair of adjacent b-rings 66 and 70 near the bottom of the blind 10), such as with P-clips 80 and 82, thereby securing the blind 10 in the collapsed configuration and providing a hunter with a convenient means for carrying the blind 10.

Figure 11:
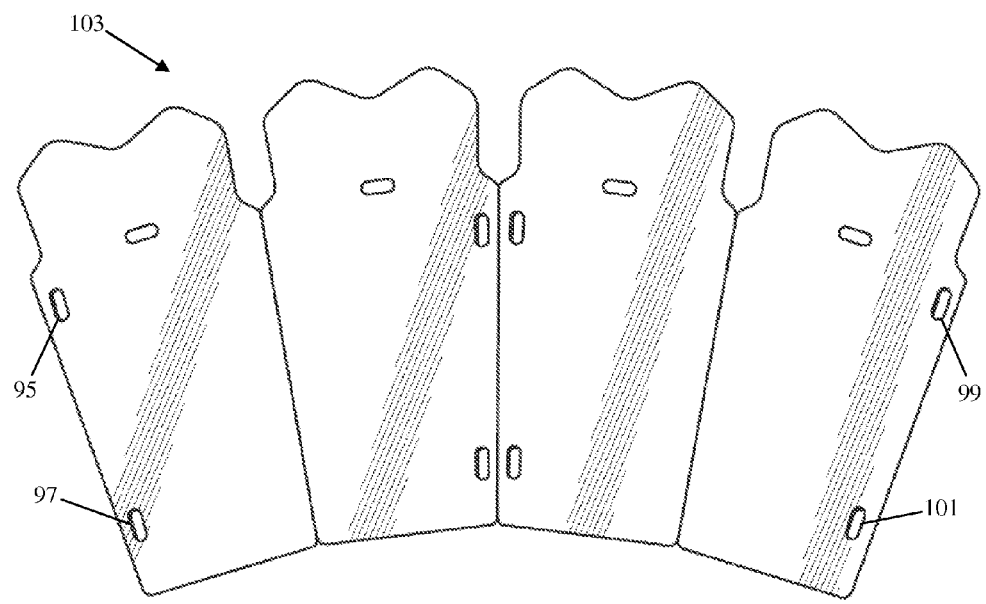
FIG. 11 is a front view illustrating an alternative embodiment of the present invention.
Figure 10A:
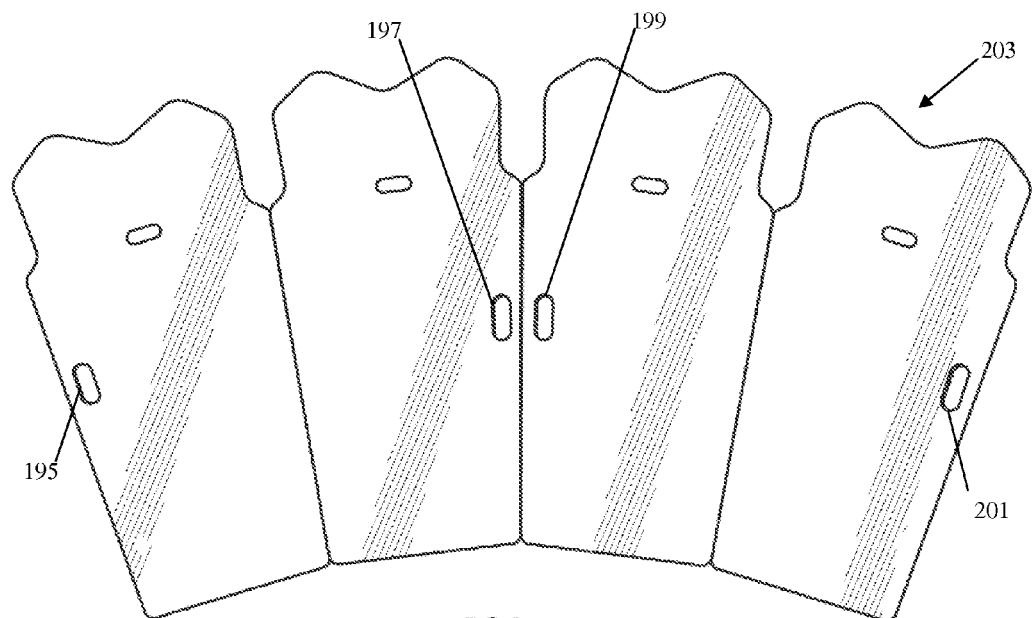
FIG. 10A is a front view illustrating an alternative embodiment of the present invention.
Figure 11A:
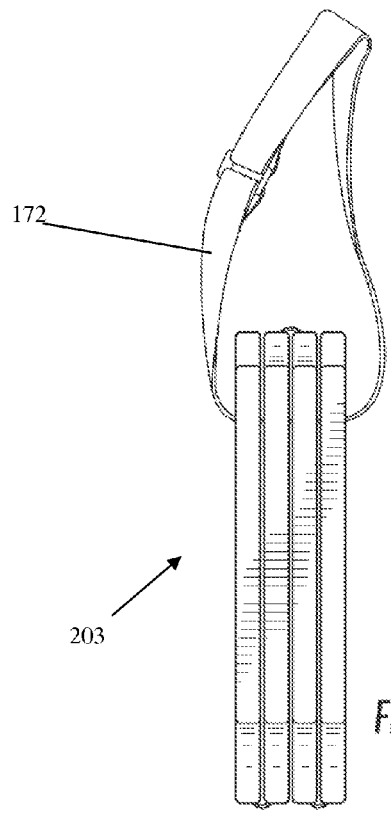
FIG. 11A is an end-on view illustrating the embodiment of the present invention shown in FIG. 10A in a compacted configuration with a shoulder strap attached thereto.

Referring to FIG. 11, an alternative embodiment of the blind 10 is contemplated in which the straps 56-62 and D-rings 64-70 shown in FIGS. 8 and 9 are omitted and wherein the mounting holes 95, 97, 99 and 101 are formed through the blind 103 for facilitating the attachment of a shoulder strap with clips in a manner similar to that described above. The mounting holes 95-101 additionally provide convenient hand grips for allowing a hunter to carry the blind 10 in a collapsed configuration with no shoulder strap attached thereto. As shown in another alternative embodiment of FIGS. 10A and 11A, one mounting hole 195, 197, 199 and 201 per side can be formed instead of the pairs of holes 95, 97, 99 and 101 as in FIG. 11. Such single mounting holes per side of each panel permits the blind 203 to be carried with one hand in the manner of a briefcase, or by a single strap 172 extended through the aligned holes when the blind 203 is in the collapsed state as shown in FIG. 10A. The strap 172 can be extended over a shoulder of the user or otherwise attached for transport. Of course, other strap-like structures can be extended through the aligned holes 195-201.

When the blind 10 is expanded and erected for use as shown in FIGS. 1 and 2, tie-downs 91 and 93 formed of nylon rope can be attached to the uppermost pair of D-rings 64 and 68 (or holes 95 and 99 in the embodiment shown in FIG. 11), such as with carabineer clips 84 and 86 or other removable fasteners, and secured to the surrounding terrain with ground spikes 90 and 92 for providing the blind 10 with greater stability as may be necessary in windy conditions or on uneven terrain. It is contemplated that the tie downs 91 and 93 can alternatively be formed of any suitable type of rope, string, chain, strap or cable. It is further contemplated that the ground spikes 90 and 92 can be omitted and that the tie-downs 91 and 93 can be tied to a natural feature or formation adjacent the blind 10, such as a tree, bush, or rock for stabilizing the blind 10.

Figure 12:
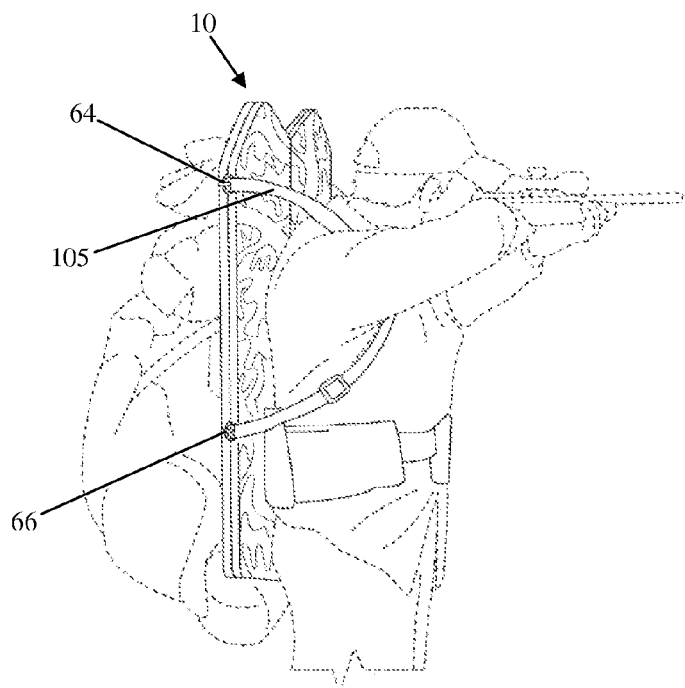
FIG. 12 is a side perspective view illustrating the preferred embodiment of the present invention shown in FIG. 1 in a compacted configuration with carry straps mounted thereto being carried by a hunter in the manner of a backpack.
Figure 13:
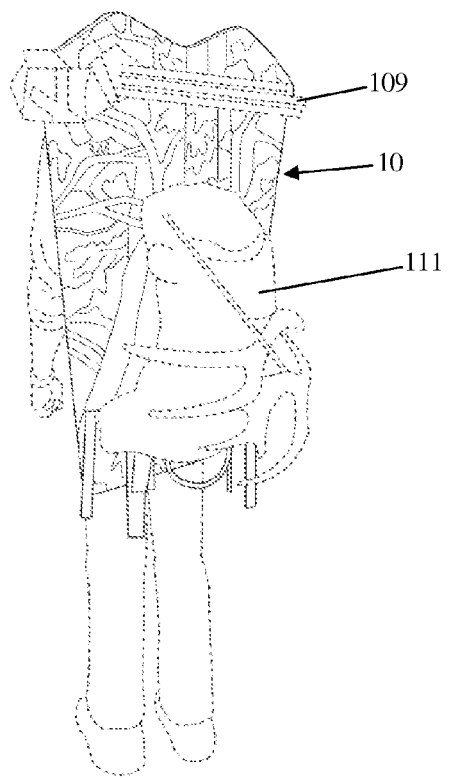
FIG. 13 is a rear perspective view illustrating the preferred embodiment of the present invention shown in FIG. 1 in a compacted configuration with carry straps mounted thereto being carried by a hunter in the manner of a backpack.

Referring to FIGS. 12 and 13, it is contemplated that carry straps 105 and 107 (carry strap 107 is not within view, but is substantially identical to carry strap 105) can be attached to each pair of vertically-adjacent D-rings 64-70 (D-rings 68 and 70 are not within view), such as with removable clips or fasteners, for allowing a hunter to carry the blind 10 on both of his or her shoulders in the manner of a backpack. The hunter is thereby able to freely wield his or her weapon while carrying the blind 10 as shown in FIG. 12. In this configuration, a plurality of straps, hooks, or other conventional fasteners are preferably mounted to a rear-facing surface of the collapsed blind 10 for allowing the blind 10 to removably hold additional gear, such as a folding chair 109 or a sleeping bag 111, as best shown in FIG. 13. Of course, other items can be attached, such as weapons (long guns and bows), heaters, antlers (for striking together) and anything else a hunter might otherwise have to carry in his or her arms.

Figure 14:
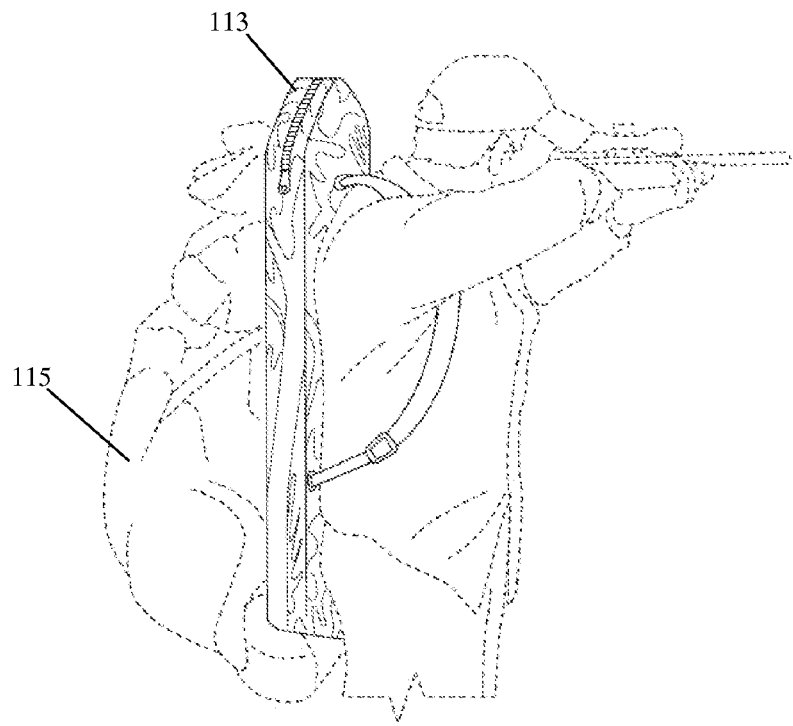
FIG. 14 is a side perspective view illustrating a bag for holding the inventive hunting blind with carry straps mounted thereto being carried by a hunter in the manner of a backpack.

Referring to FIG. 14, it is contemplated that a fitted, camouflaged bag 113 can be provided for holding the collapsed blind 10 (the blind 10 is within the zipped bag 113 and is therefore not within view in FIG. 13), in which case a shoulder strap, such as shoulder strap 72 described above, or carry straps, such as carry straps 105 and 107 described above, can be attached directly to the bag 113 instead of to a surface of the blind 10. For example, the bag 113 is shown being carried in the manner of a backpack with carry straps in FIG. 14. It is further contemplated that a plurality of straps, hooks, or other conventional fasteners can be mounted to a rear-facing surface of the bag 113 for holding gear 115 in the manner described above.

Figure 15:
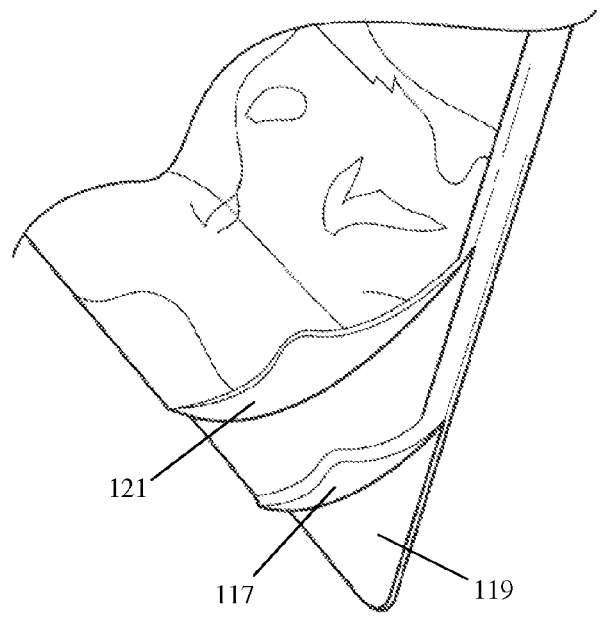
FIG. 15 is a detail view illustrating the various layers of a panel of an alternative embodiment of the present invention. Although the FIG. 15 embodiment is shown with layers peeled back, this is not intended to require such layers to be relatively flexible to enable such a configuration to be prepared by hand.

Although the above-described blind 10 incorporates flatly abutting front and rear base sheets 26 and 28 in the construction of the panels 12-18, it is contemplated, and is in some cases more preferred, that each of the panels 12-18 can alternatively be constructed using a single base sheet 117 (see FIG. 15) having a thickness that is approximately equal to the combined thicknesses of the front and rear base sheets 26 and 28 described above. In such a configuration, a reflective material layer 119 similar to the reflective material layer 30 described above is affixed to the front surface of the single base sheet 117 and a camouflage material layer 121 similar to the camouflage material layer 32 described above is affixed to the rear surface of the single base sheet 117. Invisible hinges, such as the invisible hinge 46 described above, are rigidly mounted in vertically extending slots formed in the edge(s) of the single base sheet 117 (not shown).

As described above and as shown in FIGS. 1, 2, 6 and 7, the preferred embodiment of the inventive blind 10 incorporates a total of four panels 12-18. However, it is contemplated that the blind 10 can be constructed with a greater number of panels, or that additional panels can be fastened to the blind 10, such as with tape, rivets, screws, magnetic strips or other connective hardware, for providing a hunter with a greater amount of coverage. Still further, it is contemplated that the blind 10 can be constructed with a total of one, two or three panels for allowing a hunter to carry the blind 10 in front of him or her while walking. In such a configuration, it is contemplated that an arm band or similar structure can be mounted to the rear of the blind 10 for enabling a hunter to carry the blind 10 with one arm while carrying a weapon with his or her other arm.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. A collapsible hunting blind comprising:
   (a) a first substantially planar sub-panel foldably connected to a second substantially planar sub-panel in a side-by-side relationship;
   (b) a third substantially planar sub-panel foldably connected to the second substantially planar sub-panel in a side-by-side relationship on a side of the second sub-panel opposite the first sub-panel;
   (c) a fourth substantially planar sub-panel foldably connected to the third substantially planar sub-panel in a side-by-side relationship on a side of the third sub-panel opposite the second sub-panel;
   (d) a wave-shaped top edge on each sub-panel forming at least two peaks separated by a shallow valley that, when the blind is in an operable orientation, is below said at least two peaks;
   (e) the combination of the first, second, third and fourth sub-panels formed from a large panel by a first groove cut partially through the thickness of the large panel along a first line between the first and second sub-panels, a second groove cut partially through the thickness of the large panel along a second line between the second and third sub-panels, and a third groove cut partially through the thickness of the large panel along a third line between the third and fourth sub-panels;

(f) the first, second and third grooves form first, second and third hinges, respectively, where an uncut, thin bridge of large panel material remains behind each of the grooves along which each sub-panel is foldably connected to adjacent sub-panels;

(g) each sub-panel has a camouflaged inwardly-facing surface and a reflective outwardly-facing surface, wherein the first and second lines are transverse and the second and third lines are transverse such that when the hunting blind is expanded and disposed in operable orientation on a ground surface the reflective, outwardly-facing surfaces of the sub-panels are angled toward the ground surface and upon collapsing of the hunting blind to a substantially planar configuration, the reflective, outwardly-facing surface of the first sub-panel abuts and is substantially covered over by the reflective, outwardly-facing surface of the second sub-panel, and the reflective, outwardly-facing surface of the third sub-panel abuts and is substantially covered over by the reflective, outwardly-facing surface of the fourth sub-panel;

(h) each sub-panel has deep recesses formed at its opposing lateral edges, wherein when the hunting blind is expanded a deep recess of the first sub-panel combines with an adjacent deep recess of the second sub-panel, another deep recess of the second sub-panel combines with an adjacent deep recess of the third sub-panel, and another deep recess of the third sub-panel combines with an adjacent deep recess of the fourth sub-panel to form first, second and third deep pockets disposed directly above the respective first, second and third hinges connecting the sub-panels, wherein the deep pockets have an open top into which a hunter can place a weapon to observe, while holding the weapon in a firing position in the deep pocket, and fire upon prey from behind the hunting blind while remaining substantially obscured by the hunting blind.

2. The improved hunting blind in accordance with claim 1, wherein each panel is formed of two base sheets of rigid, lightweight material, each base sheet having a first major surface and an opposing second major surface, the first major surfaces of the base sheets mounted together in a flatly abutting relationship, the second major surface of one of the base sheets covered with a reflective material and the second major surface of the other base sheet covered with a camouflage material.

3. The improved hunting blind in accordance with claim 1, wherein each of the panels is connected to an adjoining one of the panels by a hinge defined by an elongated strip of flexible material extending from adjoining edges of each adjacent pair of the panels.

4. The hunting blind in accordance with claim 3, wherein the elongated strip of flexible material extends along a line at a deepest point of a groove formed through at least one of the surfaces of at least one of the panels, the elongated strip of flexible material thereby forming a live hinge between each pair of adjoined panels.

5. The improved hunting blind in accordance with claim 1, wherein a periphery of the hunting blind has no corners for allowing the hunting blind to visually blend in with a surrounding natural environment.

6. The improved hunting blind in accordance with claim 1, further comprising a pair of carry straps connected to the for securing the blind in a compact configuration and allowing a hunter to conveniently carry the blind in the manner of a backpack.

7. The improved hunting blind in accordance with claim 1, further comprising apertures formed through the blind adjacent the lateral edges of the blind for accommodating the attachment of straps to the blind and for providing convenient handgrips adjacent the edges of the blind.

8. The improved hunting blind in accordance with claim 1, further comprising at least one fastener mounted to a surface of the blind for removably holding gear.

9. The improved hunting blind in accordance with claim 1, further comprising a bag for holding the blind when the blind is collapsed for transportation.

10. The improved hunting blind in accordance with claim 9, further comprising a shoulder strap mounted to the bag for allowing a hunter to conveniently carry the blind over one shoulder.

11. The improved hunting blind in accordance with claim 9, further comprising a pair of carry straps mounted to the bag for allowing a hunter to conveniently carry the blind in the manner of a backpack.

12. The improved hunting blind in accordance with claim 9, further comprising at least one fastener mounted to a surface of the bag for removably holding gear.

13. The improved hunting blind in accordance with claim 1, wherein at least some of the connected, side-by-side panels are wider at their upper ends than their lower ends, thereby causing the blind to tilt away from the hunter behind the blind when the blind extends arcuately around the hunter.

14. The improved hunting blind in accordance with claim 13, wherein all of the connected, side-by-side panels are wider at their upper ends than their lower ends.

15. The improved hunting blind in accordance with claim 4, wherein the groove is V-shaped.

16. The improved hunting blind in accordance with claim 4, wherein the groove has sidewalls that converge to form a floor.

* * * * *